BINARY ADDER CIRCUIT USING DENIAL LOGIC

Filed Jan. 20, 1966

WITNESSES:
John G. Chopp
Wm. B. Sellers

INVENTORS
Auseklis Brastins and
Frank G. Willard
BY E. F. Possessky
ATTORNEY

United States Patent Office 3,454,751

Patented July 8, 1969

3,454,751

BINARY ADDER CIRCUIT USING DENIAL LOGIC

Auseklis Brastins, Pittsburgh, and Frank G. Willard, Monroeville, Pitcairn, Pa., assignors to Westinghouse Electric Corporation, Pittsburgh, Pa., a corporation of Pennsylvania Filed Jan. 20, 1966, Ser. No. 521,936

Int. Cl. G06f 7/385, 7/42, 7/50

U.S. Cl. 235—176 7 Claims

ABSTRACT OF THE DISCLOSURE

A circuit employing NAND or other denial logic provides for the performance of parallel or series addition operations on binary numbers as well as other logic operations. Fewer denial logic elements are used than would be required by straightforward translation of logic equations into logic circuitry.

*Background of the invention*

The present invention relates to logic circuits and more particularly to binary adder circuits in which denial or NAND or NOR logic is employed.

In the manufacture of adder circuits for use in computers or other products, it is often desirable for mass production economy that a single type of logic element be employed throughout the circuitry. NAND or NOR logic frequently is desired for circuit use because of design advantages in particular applications or because of commercial supply factors.

To design a NAND or NOR adder circuit, one can employ the technique of writing the applicable binary addition in simplest algebraic form and translating the equation elements into hardware logic elements. However, the resultant circuitry is not always the simplest and most economic arrangement for achieving the desired addition or subtraction operation. Additional circuit simplification often requires considerable conceptual effort.

Particularly in computer applications, it is further desirable to provide an adder circuit operative to produce other logic functions along with the addition or subtraction operation. For example, it may be desired to operate a NAND adder as an AND circuit or an exclusive OR circuit at certain times during its period of usage. A need for multifunctional circuitry can thus complicate the conceptual effort toward simplification by restricting or apparently restricting the possibilities otherwise available for simplifying straight binary addition or subtraction circuitry.

*Summary of the invention*

In accordance with the broad principles of the present invention, a novel denial logic adder circuit is arranged to produce logic functions including binary addition or subtraction with improved economy and efficiency. The circuit is adaptable to series or parallel binary addition or subtraction operation as well as $\overline{\text{AND}}$ or AND or exclusive OR operation. It comprises a first half adder and at least the input logic level of a second half adder. Logic elements are preferably in the form of NAND elements, but they can be in the form of NOR or NOT/AND or NOT/OR elements. The logic element connections includes a carry input connection to an input of the output logic level of the first half adder and connections between the output of the input logic level of the first half adder and inputs of the input logic level of the second half adder.

It is, therefore, an object of the invention to provide a novel binary denial logic adder circuit which is characterized with improved economy.

Another object of the invention is to provide a novel binary denial logic adder circuit which is characterized with improved efficiency.

A further object of the invention is to provide a novel binary denial logic adder circuit which is characterized with a reduced number of denial type logic elements of a common type.

An additional object of the invention is to provide a novel binary denial logic adder circuit which is characterized with improved efficiency and economy and which nonetheless is adaptable to producing addition and subtraction as well as other useful logic functions.

These and other objects of the invention will become more apparent upon consideration of the following detailed description along with the attached drawings.

*Description of the preferred embodiments*

Figure 1:
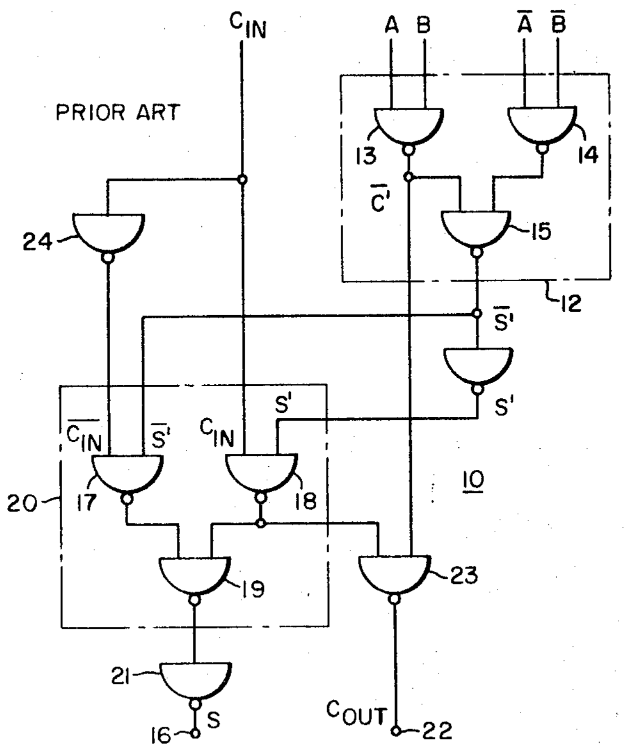
FIGURE 1 shows a schematic diagram of typical prior art denial logic adder circuit.

More specifically, there is shown in FIGURE 1 a typical denial logic or NAND adder circuit 10 arranged directly in accordance with logic equations derived from the following truth table which contains all of the logic possibilities for full binary addition:

TRUTH TABLE

| | | | | | | | | |
|---|---|---|---|---|---|---|---|---|
| A | 0 | 1 | 0 | 1 | 0 | 1 | 0 | 1 |
| B | 0 | 0 | 1 | 1 | 0 | 0 | 1 | 1 |
| $C_{in}$ | 0 | 0 | 0 | 0 | 1 | 1 | 1 | 1 |
| S | 0 | 1 | 1 | 0 | 1 | 0 | 0 | 1 |
| $C_{out}$ | 0 | 0 | 0 | 1 | 0 | 1 | 1 | 1 |

A and B represent addend and augend bits and $C_{in}$ represents the carry bit from the next lower order of the binary numbers being added. S represents the sum bit for the order undergoing addition, and $C_{out}$ represents the carry bit for carry-over to the next higher order of the binary numbers.

The logic equations for the results of addition follow:

$$(1)\quad S=A\cdot\bar{B}\cdot\bar{C}_{in}+\bar{A}\cdot B\cdot\bar{C}_{in}+\bar{A}\cdot\bar{B}\cdot C_{in}+A\cdot B\cdot C_{in}$$
$$=(A\cdot\bar{B}+\bar{A}\cdot B)\cdot\bar{C}_{in}+(A\cdot B+\bar{A}\cdot\bar{B})\cdot C_{in}$$
$$=S'\cdot\bar{C}_{in}+\bar{S}'\cdot C_{in}$$

$$(2)\quad C_{out}=A\cdot B\cdot\bar{C}_{in}+A\cdot\bar{B}\cdot C_{in}+\bar{A}\cdot B\cdot C_{in}+A\cdot B\cdot C_{in}$$
$$=A\cdot B\cdot(\bar{C}_{in}+C_{in})+(A\cdot\bar{B}+\bar{A}\cdot B)\cdot C_{in}$$
$$=A\cdot B+S'\cdot C_{in}$$

Since the output of a NAND gate is logically defined by:

$$(3)\quad \text{NAND }(A, B)\overset{\Delta}{=}\overline{A\cdot B}=\bar{A}+\bar{B}$$

it is evident that three NAND gate elements 13, 14 and 15 can be combined to form a half adder as indicated by dotted block 12 in FIG. 1 so as to produce a half addition sum as denoted by:

(4)

$$\text{NAND half adder: }\overline{\overline{\overline{(A\cdot B)}\cdot\overline{(\bar{A}\cdot\bar{B})}}}=\overline{\overline{\overline{C'}\cdot\overline{(\bar{A}\cdot\bar{B})}}}$$
$$=\overline{\overline{C'}+\bar{A}\cdot\bar{B}}=S'$$

Therefore, the sum signal S at output terminal 16 in the adder circuit 10 is produced by the first NAND half adder 12 in combination with NAND gate elements 17, 18 and 19 in a second NAND half adder 20 by conventionally coupling the first half adder output $\overline{S}'$ and its complement S′ and the $C_{in}$ signal and its complement $\overline{C}_{in}$ with inputs of the second NAND half adder 20. The sum output S is the complement of the second half adder output as generated by NAND gate 21 and as given by:

(5)
$$S=\overline{\overline{(S'\cdot\overline{C}_{in})}\cdot\overline{(\overline{S'}\cdot C_{in})}}=S'\cdot\overline{C}_{in}+\overline{S}'\cdot C_{in}$$

which corresponds to Equation 1. The carry out signal $C_{out}$ is generated at terminal 22 by NAND element 23 as given by:

(6)
$$C_{out}=\overline{\overline{(A\cdot B)}\cdot\overline{(S'\cdot C_{in})}}=A\cdot B+S'\cdot C_{in}$$

which corresponds to Equation 2.

The full binary adder 10 is characterized with a parallel mode of operation when connected with other similar units for carry propagation purposes, and it requires a total of ten NAND elements. The adder 10 is not necessarily the best prior art denial logic or NAND adder circuit, but it is typical and serves to highlight the improved nature of the present invention.

With the use of NOR logic, the input signals A, B and $C_{in}$ are complemented to produce $\overline{S}$ and $\overline{C}_{out}$ and a similar circuit with ten NOR elements is required. The adder circuit 10 can also be operated as a subtractor with A as a minuend B as a subtrahend simply by using the complement of B at the adder input and adding the A and $\overline{B}$ signals.

In addition to functioning as a subtractor, the adder circuit 10 can produce other logic functions such as an AND function and an exclusive OR function which are commonly required in computer applications. Thus, by connecting an $\overline{\text{AND}}$ bus (not shown) to respective inputs of the NAND gates 14 and 23, the adder 10 produces the addition or subtraction function when the $\overline{\text{AND}}$ bus is at logic 1 value and produces an AND function at the output terminal 16 when the $\overline{\text{AND}}$ bus is at logic 0 value (i.e., $S=A\cdot B$). Similarly, by connecting an $\oplus$ bus (not shown) to an input of carry negation NAND gate 24 and the second half adder NAND gate 18, the adder 10 produces the addition or subtraction function when the $\overline{\oplus}$ bus is at logic 1 value and produces an exclusive OR function at the output terminal 14 when the $\overline{\oplus}$ bus is at logic 0 value (i.e., the output equals $A\cdot\overline{B}+B\cdot\overline{A}$).

Figure 2:
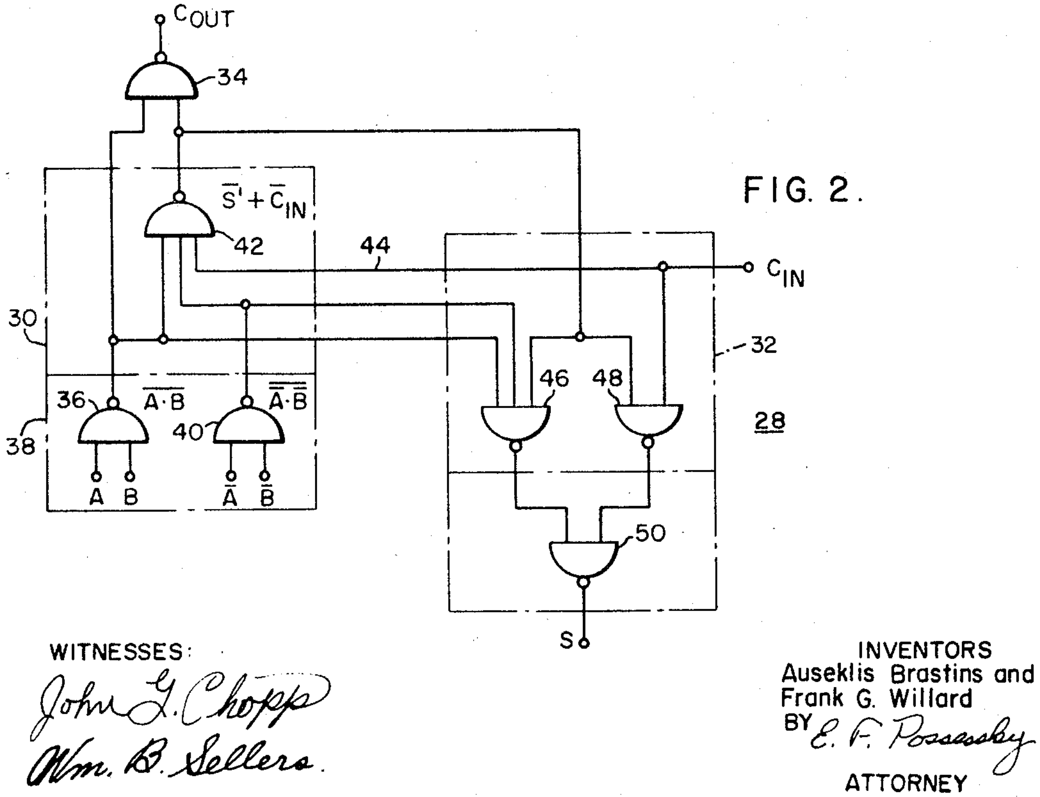
FIG. 2 shows a schematic diagram of a NAND adder circuit arranged in accordance with the principles of the invention.

In accordance with the principles of the present invention, there is shown in FIG. 2 a binary denial logic adder circuit 28 comprising a first half adder 30 and a second half adder 32 in combination with a carry generation logic gate 34. The half adders 30 and 32 and the carry gate 34 are preferably commonly formed from a single logic element type and preferably from NAND logic elements. By denial logic it is meant to refer to NAND, NOT/AND, NOR, and NOT/OR logic.

Generally, the adder 28 is arranged with improved economy of construction and efficiency of operation in achieving the logic functions of binary addition or subtration. Thus, in the illustrated NAND logic, or in NOR logic (not shown), a total of 7 logic elements produce the desired operation. As more fully described in connection with FIG. 4, additional logic functions can also be provided without any increase in the number of logic elements. While the descriptive term "adder" is used to keynote an important function of the circuit 28, it is intended that the term "adder" also describe circuits which perform addition as well as other logic functions.

Figure 3:
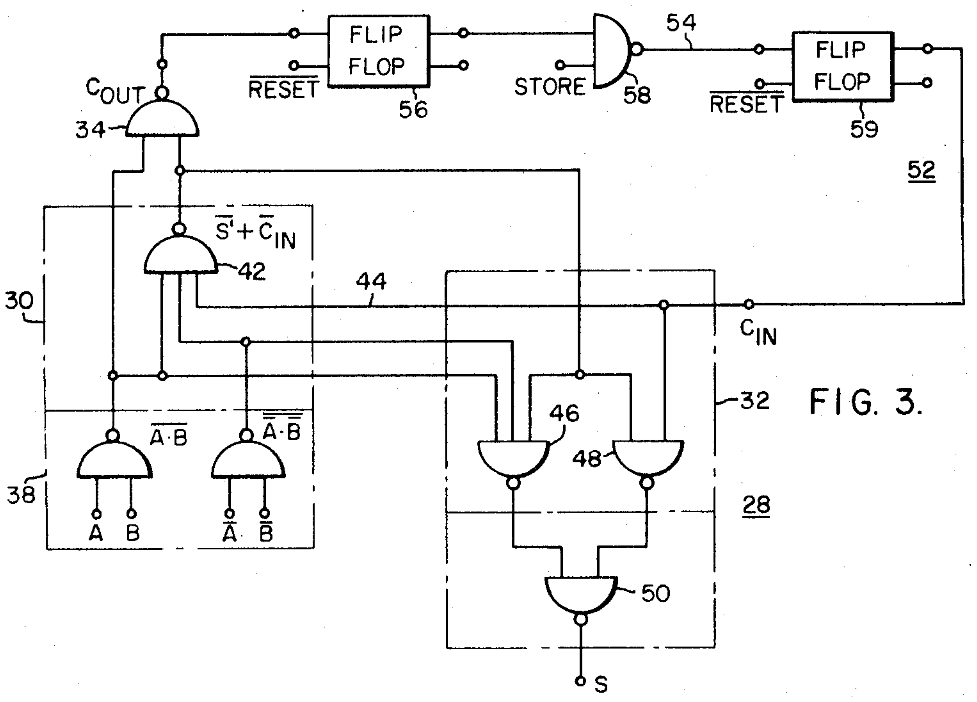
FIG. 3 shows a schematic diagram of another embodiment of the invention which is characterized with serial operation.

The adder circuit 22 is adaptable to parallel adder operation (FIG. 2) or series adder operation (FIG. 3). The logic circuitry can be totally integrated with the logic elements forming portions of the integrated circuit block (not shown), or it can be fabricated from individual integrated logic elements or other hardware logic units. In solid state logic units, diode transistor logic or resistor transistor logic or other suitable logic circuitry can be employed.

In parallel operation, the adder 28 is combined with other identical circuits to provide addition in each order of input addend and augend binary numbers and to provide carry propagation between the orders. In the adder 28, input signals A and B representing an addend and an augend of a predetermined order in the input binary numbers are applied to NAND gate 36 in an input logic level 38 of the NAND half adder 30. Complement signals $\overline{A}$ and $\overline{B}$ are applied to the other input logic level NAND gate 40.

As required by the foregoing truth table for addition, the output carry signal $C_{out}$ is generated by the carry gate 34 when any two or all three of the signals A and B and $C_{in}$ have a logic 1 value. Thus, the output of the NAND gate 36 and an output logic level NAND gate 42 are coupled to an input of the carry gate 34. Further, the output of both input logic level NAND gates 36 and 40 and the carry input signal $C_{in}$ on a carry input bus 44 are coupled to inputs of the output logic level NAND gate 42. Accordingly, the $C_{out}$ signal is given by:

(7)
$$C_{out}=\overline{\overline{(A\cdot B)}\cdot\overline{[\overline{(A\cdot B)}\cdot\overline{(\overline{A}\cdot\overline{B})}\cdot C_{in}]}}$$
$$=\overline{\overline{(A\cdot B)}\cdot[A\cdot B+\overline{A}\cdot\overline{B}+\overline{C}_{in}]}=(A\cdot B)+\overline{(\overline{S'}+\overline{C}_{in})}$$
$$=A\cdot B+S'\cdot C_{in}$$

which corresponds to Equation 2 as required. By applying the carry input signal $C_{in}$ to an input of the first half adder NAND gate 42, the $C_{out}$ signal is economically and efficiently produced by means of a connection between the output of the NAND gate 36 and an input of the carry gate 34 and by means of a direct connection between the output of the NAND gate 42 and another input of the carry gate 34.

In producing an output sum signal S when any one or all three of the signals A and B and $C_{in}$ are at logic 1 value, the output from the first half adder output logic level NAND gate 42 is connected to an input of each of two input logic level NAND gates 46 and 48 in the second half adder 32. In addition, the $C_{in}$ signal is coupled to another input of the second half adder NAND gate 48, and the outputs of the first half adder NAND gates 36 and 40 are connected to respective inputs of the second half adder NAND gate 46. Accordingly, the sum signal S is given by:

(8)
$$S=\overline{\overline{[\overline{(A\cdot B)}\cdot\overline{(\overline{A}\cdot\overline{B})}\cdot(\overline{S'}+\overline{C}_{in})]}\cdot\overline{[(C_{in})\cdot(\overline{S'}+\overline{C}_{in})]}}$$
$$=[\overline{(A\cdot B)}\cdot(\overline{A}\cdot\overline{B})\cdot(\overline{S'}+\overline{C}_{in})]+[(C_{in})\cdot(\overline{S'}+C_{in})]$$
$$=[(\overline{A}+\overline{B})\cdot(A+B)\cdot(\overline{S'}+\overline{C}_{in})]+[C_{in}\cdot\overline{S'}]$$
$$=[S'\cdot(\overline{S'}+\overline{C}_{in})]+[C_{in}\cdot\overline{S'}]=(S'\cdot\overline{C}_{in})+(\overline{S'}C_{in})$$

which corresponds to Equation 1 as required. With the described connections, the adder 28 generates the sum signal S with improved efficiency and economy.

Since each of the denial logic elements in the adder circuit 28 have three or fewer input connections, elements such as integrated circuit blocks which have a limited number of inputs can be conveniently employed. To perform subtraction, one of the input signals A or B is complemented and the circuit 28 is operated in the manner described for the addition process. Denial logic types other than NAND logic can be employed; for example, a NOR logic element can be employed in place of each NAND element and the significance of all logic states is reversed for addition operation of the NOR circuit as an adder. In some cases, it may be desired to employ a two wire output for the sum and carry signals S and $C_{out}$, and in that event the carry gate 34 and NAND gate 50 in the second half adder 32 can be omitted. The outputs from the first half adder NAND gates 36 and 42 then form the carry out signal and the outputs from the second half adder NAND gates 46 and 48 form the sum signal.

In FIG. 3, there is shown another embodiment of the invention in which the adder circuit 28 is connected for serial operation. Thus, a serial adder 52 includes the adder circuit 28 and a carry propagation circuit 54. In series addition, number bits of successive orders of addend and augend numbers are added in successive bit times and any carry generated by the addition of the bits of any one order is time propagated for addition with the number bits of the next higher order.

In this instance, the carry propagation circuit 54 includes a standard NAND flip-flop 56 having its set input terminal connected to the output of the carry generation gate 34 and a NAND carry propagation logic element 58 having one of its inputs coupled to the set output terminal of the NAND flip-flop 56. A store signal is obtained from a suitable system clock (not shown) and applied at another input of the carry propagation gate 58. In each of the successive predetermined bit time intervals, a store pulse is properly timed to result in the generation of a carry propagation signal if the output set terminal of the flip-flop 56 is at logic 0 value after the gate 34 has been operated and during the same bit time. A carry propagation signal is thus generated in each bit time during which a carry generation signal is generated by the gate 34. In turn each carry propagation signal causes a store flip-flop 59 to be set so as to generate a carry input signal at the carry input terminal in the next successive bit time interval. A RESET signal times the resetting of the flip-flops 56 and 59 for operation in successive bit time intervals. Carry propagation is thus properly realized for operating the efficiently arranged serial adder 52.

Figure 4:
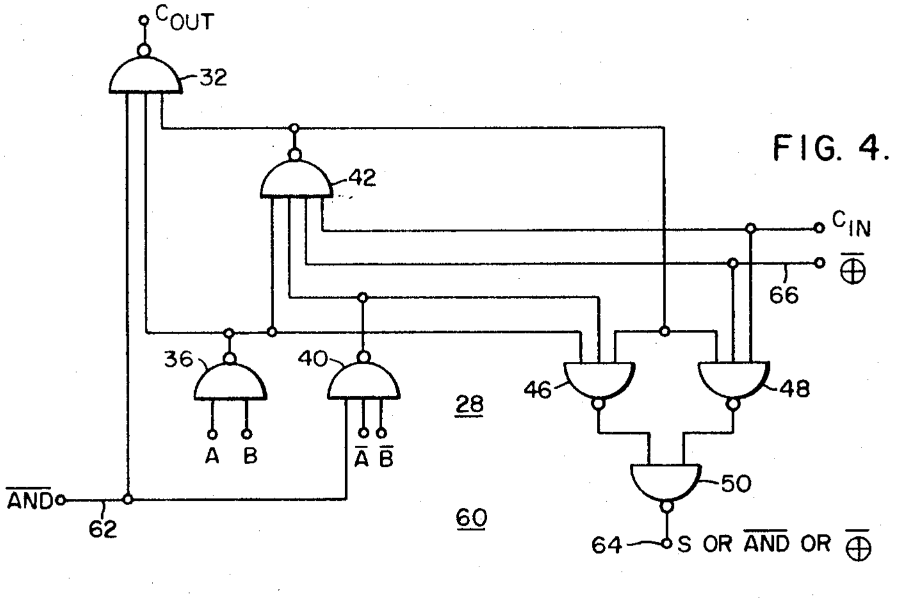
FIG. 4 shows a schematic diagram of another modified form of the invention which provides addition, subtraction and other logic functions.

In FIG. 4, there is shown another embodiment of the invention in the form of an adder circuit 60 including the parallel adder circuit 28 of FIG. 2 with modifications to perform $\overline{\text{AND}}$ and exclusive OR logic functions as well as the operation of addition. Thus, an $\overline{\text{AND}}$ bus 62 is connected to an input of the first half adder NAND gate 40 and an input of the carry generation gate 34 to produce the $\overline{\text{AND}}$ function. When the bus 62 is held at logic 1 value, the circuit 60 produces addition operation. When the bus 62 is switched to a logic 0 value, a simple $\overline{\text{AND}}$ function is performed on the input signals A and B and generated at output terminal 64. If desired, an AND function is readily produced by negating the signal at the terminal 64.

Similarly, an $\overline{\ominus}$ bus 66 is connected to an input of NAND gate 48 and NAND gate 42 to produce an exclusive OR function. When the bus 66 is at logic 1 value, the circuit 60 produces an addition operation. When the bus 66 is switched to a logic 0 value, an exclusive OR function is performed on the input signals A and B and generated at the output terminal 64.

The foregoing description has been presented only to illustrate the principles of the invention. Accordingly, it is desired that the invention not be limited by the embodiments described, but, rather, that it be accorded an interpretation consistent with the scope and spirit of its broad principles.

What is claimed is:

1. A circuit for use in performing addition and like operations, said circuit comprising a half adder having a pair of denial logic input elements, a denial logic output element having respective inputs to which the outputs of said input elements are respectively coupled, a pair of denial logic sum generation elements, means for coupling a carry input signal to an input of said half adder output element and to an input of one of said sum generation elements, means for coupling addend and augend signals to respective inputs of one of said half adder input elements and for coupling complements of the addend and augend signals to respective inputs of the other of said half adder input elements, an output of said half adder output element coupled to respective inputs of said sum generation elements, and the outputs of said half adder input elements further coupled to the other of said sum generation elements.

2. A circuit as set forth in claim 1 wherein all of said logic elements are NAND elements.

3. A circuit as set forth in claim 1 wherein a denial logic carry generation element has respective inputs coupled to the outputs of said half adder output element and said one half adder input element, and a denial logic output sum generation element has respective inputs coupled to the outputs of the first mentioned sum generation elements.

4. A circuit as set forth in claim 3 wherein all of said logic elements are NAND elements.

5. A circuit as set forth in claim 3 wherein means are provided for holding said carry generation element and said other half adder input element in a predetermined output logic state so that an $\overline{\text{AND}}$ function is produced on the input addend and augend signals at the output of said output sum generation element.

6. A circuit as set forth in claim 3 wherein means are provided for holding said half adder output element and said one sum generation element in a predetermined output logic state so that an exclusive OR function is produced on the addend and augend signals at the output of said output sum generation element.

7. A circuit as set forth in claim 3 wherein means are provided for operating the adder in the serial mode, said operating means including means coupling the output of said carry generation element to an input of said half adder output element and to an input of said one sum generation element.

References Cited

UNITED STATES PATENTS

| | | | |
|---|---|---|---|
| 3,388,239 | 6/1968 | Duncan et al. | 235—175 |
| 3,291,973 | 12/1968 | Rasche | 235—176 |
| 3,094,614 | 6/1963 | Boyle | 235—176 |
| 3,074,640 | 1/1963 | Maley | 235—176 |
| 3,075,093 | 1/1963 | Boyle | 307—88.5 |

OTHER REFERENCES

W. W. Boyle: NOR Block Full-Adder, September 1960, IBM Technical Disclosure Bulletin, p. 48.

MALCOLM A. MORRISON, *Primary Examiner.*

D. H. MALZAHN, *Assistant Examiner.*

U.S. Cl. X.R.

235—175